United States Patent
Zhu et al.

(10) Patent No.: US 8,300,601 B2
(45) Date of Patent: Oct. 30, 2012

(54) SYSTEM AND METHOD FOR IMPLEMENTING EFFECTIVE CHANNEL QUALITY INDICATION

(75) Inventors: Chenxi Zhu, Gaithersburg, MD (US); Wei-Peng Chen, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 573 days.

(21) Appl. No.: 12/473,410

(22) Filed: May 28, 2009

(65) Prior Publication Data

US 2010/0103887 A1 Apr. 29, 2010

Related U.S. Application Data

(60) Provisional application No. 61/108,658, filed on Oct. 27, 2008.

(51) Int. Cl.
*H04W 4/00* (2009.01)
(52) U.S. Cl. ...................................................... 370/331
(58) Field of Classification Search .................. 370/310, 370/310.2, 328, 332, 329, 331, 315, 341, 370/335, 431, 330, 338, 349, 464, 465
See application file for complete search history.

(56) References Cited

U.S. PATENT DOCUMENTS 7,830,977 B2 * 11/2010 Li et al. .......................... 375/267
2008/0219219 A1 * 9/2008 Sartori et al. .................. 370/335

* cited by examiner

*Primary Examiner* — Kwang B Yao
*Assistant Examiner* — Anh Ngoc Nguyen
(74) *Attorney, Agent, or Firm* — Baker Botts L.L.P.

(57) ABSTRACT

A method for implementing effective channel quality indication includes, at an endpoint of a wireless network, establishing a communication session with an access station via a wireless connection. The method also includes determining a highest modulation and coding scheme ("MCS") value supported by the endpoint using the wireless connection. The method further includes determining whether an immediately preceding MCS level is supported by the endpoint using the wireless connection. The method additionally includes transmitting a message from the endpoint. The message comprises an effective channel quality indication ("ECQI") provides an indication of the highest supported MCS level for the wireless connection and an indication of whether the endpoint supports the immediately preceding MCS value for the wireless connection.

10 Claims, 3 Drawing Sheets

SYSTEM AND METHOD FOR IMPLEMENTING EFFECTIVE CHANNEL QUALITY INDICATION

CROSS-REFERENCE TO RELATED APPLICATION

This application claims priority under 35 U.S.C. §119(e) to U.S. Provisional Application Ser. No. 61/108,658 filed Oct. 27, 2008, which is hereby incorporated by reference in its entirety.

TECHNICAL FIELD OF THE INVENTION

This invention relates in general to communication systems and, more particularly, to a system and method for implementing effective channel quality indication.

BACKGROUND OF THE INVENTION

Adaptive modulation and coding schemes are widely used in wireless communication where the channel quality can determine the usable modulation and coding schemes (MCS). Higher order modulation and coding rates produce higher spectrum efficiency and are used when the received signal comprises a high signal-to-noise ratio (SNR), while low order modulation is used when the received SNR is low.

SUMMARY

In accordance with a particular embodiment, a method for implementing effective channel quality indication includes, at an endpoint of a wireless network, establishing a communication session with an access station via a wireless connection. The method also includes determining a highest modulation and coding scheme ("MCS") value supported by the endpoint using the wireless connection. The method further includes determining whether an immediately preceding MCS level is supported by the endpoint using the wireless connection. The method additionally includes transmitting a message from the endpoint. The message comprises an effective channel quality indication ("ECQI") provides an indication of the highest supported MCS level for the wireless connection and an indication of whether the endpoint supports the immediately preceding MCS value for the wireless connection.

Technical advantages of particular embodiments may include allowing an endpoint to more accurately communicate the supported MCS levels to its access station. Accordingly, the access station may be more efficient and accurate in assigning MCS levels.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
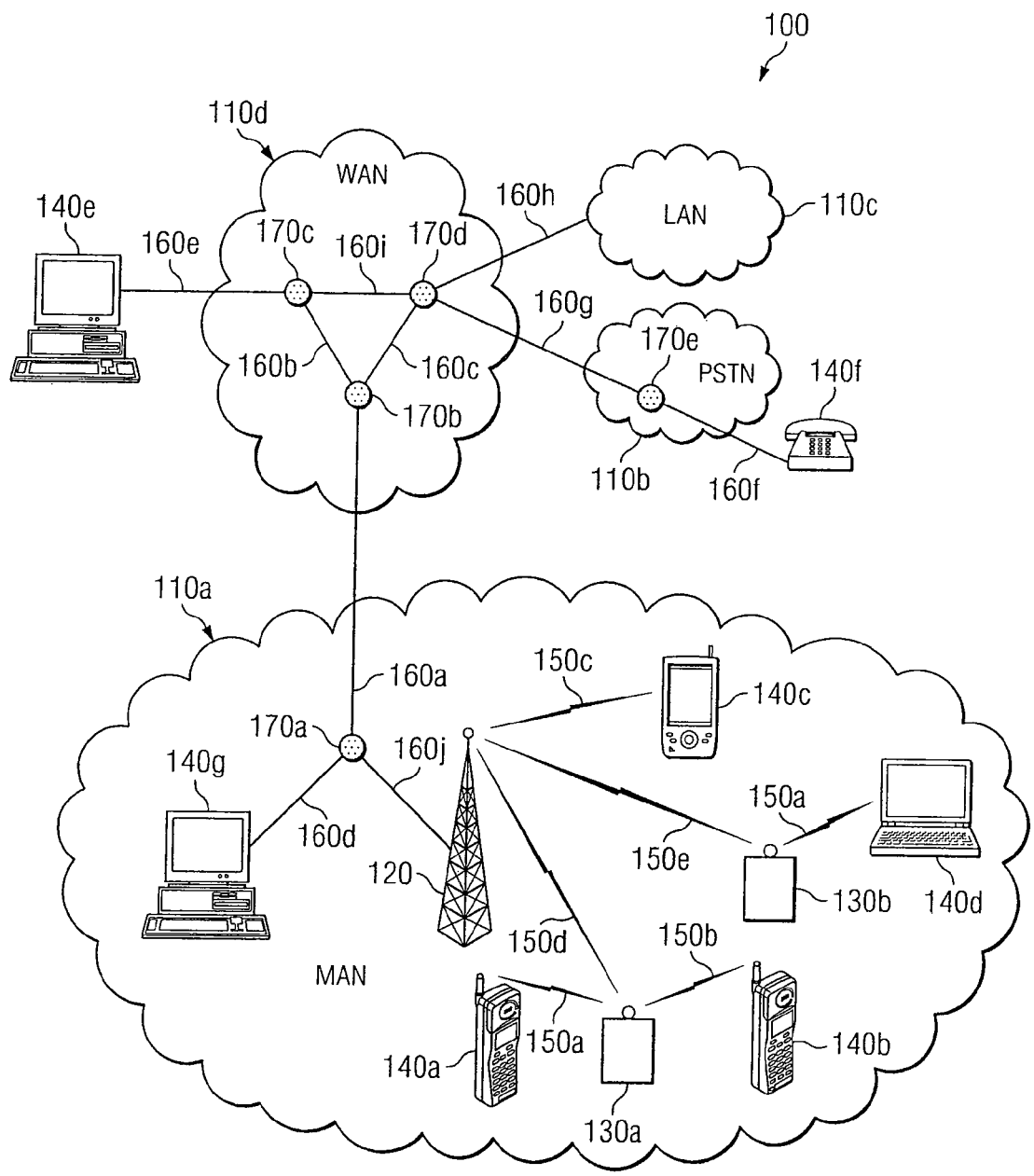
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110, including network 110a which includes wireless components. The base station 120, relay stations 130 and endpoints 140 may implement effective channel quality indication (ECQI) as a means of reporting which modulation and coding scheme levels are supported. For example, endpoint 140c may inform base station 120 which MCS levels are supported on wireless link 150c. This is typically done by reporting the highest supported MCS level with the assumption that all lower MCS levels are also supported (see Table 1 for a list of MCS levels as used in IEEE 802.16e). However, in certain situations endpoint 140c may not be able to support every MCS level below the highest supported MCS level (e.g., two adjacent MCS levels may switch with one another). Accordingly, in particular embodiments, by appropriately setting an MCS level inversion bit, endpoint 140c may alert base station 120 that the order of the highest supported MCS level and the immediately preceding MCS level has been inverted. This, in effect, alerts base station 120 that endpoint 140c does not support the immediately preceding MCS level.

TABLE 1

| Modulation | Coding Rate | Receiver SNR (dB) |
|---|---|---|
| QPSK | ½ | 5 |
|  | ¾ | 8 |
| 16QAM | ½ | 10.5 |
|  | ¾ | 14 |
| 64QAM | ½ | 16 |
|  | ⅔ | 18 |
|  | ¾ | 20 |

Each MCS level (e.g., QPSK ¾) has an associated SNR (e.g., 8 dB) that is required to support the respective MCS level. Thus, it may often be the case that if an endpoint supports a particular MCS level, it also supports all the preceding MCS levels below that particular MCS level. In other words, if the SNR is high enough to support a particular MCS level, it is likely high enough to support any of the lower MCS levels. However, while the order of MCS levels depicted in Table 1 generally holds true, there are situations in which two adjacent levels may switch (e.g., when the channel type of the wireless connection changes).

The channel type received by an endpoint is constantly changing-potentially changing the order of the required SNR for certain MCS levels. Thus, it may not be desirable to use an index order, created for a particular channel type (e.g., Table 1), with different types of channels. Nor may it be desirable for the base station to attempt to predict what channel type the endpoint is receiving, or have the endpoint communicate the channel type to the base station. Furthermore, if an endpoint were to accurately compute which MCS levels it can and can not support, traditional CQIs did not provide a way for the endpoint to signal this to the base station. Thus, there is an increased chance of possible packet errors or wasted resources.

In particular embodiments, endpoints 140 may use ECQI. ECQI may include information not found in a typical CQI, such as an MCS level inversion bit. The additional information may allow the endpoint to signal to the base station that a particular MCS level is not supported without having to provide the base station with the channel type.

For example, assume endpoint 140b determines that, with the channel type it is receiving, the highest MCS level it can support is 64QAM ½ and that the immediately preceding MCS level, 16QAM ¾, cannot be supported. In such a situation, endpoint 140b may send an ECQI comprising the highest supported MCS level, 64QAM ½, and an MCS level inversion bit set to indicate that the immediately preceding MCS level is not supported (e.g., 16QAM ¾ and 64QAM ½ are inverted). Thus, base station 120 may be informed that it may use any MCS level below the highest MCS level (e.g., 64QAM ½, 16QAM ½, and QPSK ¾) except for the immediately preceding MCS level (e.g., 16QAM ¾). This takes advantage of the notion that even if the highest supported and the immediately preceding MCS levels are inverted, the wireless connection condition is likely good enough to support all the MCS levels below the immediately preceding MCS level. Furthermore, because there is no need for the endpoint or the base station to estimate the channel type or signal the channel type to the other party the overhead is low (only a single bit is added to the traditional CQI encoding).

Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality that may be provided by a network. Networks 110 may provide their respective services using any of a variety of protocols for either wired or wireless communication. For example, network 110a may comprise any one of a variety of different wireless technologies such as 3G, 802.16 (popularly known as WiMAX), or any other wireless technology that supports the use of a CQI channel.

Although communication system 100 includes four different types of networks, networks 110a-110d, the term "network" should be interpreted as generally defining any network or combination of networks capable of transmitting analog or digital signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Networks 110 may be connected to each other and with other networks via a plurality of wired links 160, wireless links 150, and nodes 170. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d. For purposes of illustration and simplicity of explanation, network 110a is a MAN that may be implemented, at least in part, via WiMAX, network 110b is a PSTN, network 110c is a LAN, and network 110d is a WAN.

In some embodiments, wireless links 150, of network 110a, may represent wireless links using, for example, WiMAX. Wireless links 150 may comprise two different types of links referred to as a relay link and an access link. An access link may refer to the wireless connection between an endpoint and an access station (e.g., a base station or a relay station); and a relay link may refer to the wireless connection between a relay station and another relay station or base station.

A wireless connection, or link, may comprise various wireless resources such as, for example, a combination of a particular center frequency, a particular bandwidth, a particular time slot, and/or a particular subchannel (for example, as described in a downlink or uplink MAP). In addition, external factors, such as distance, interference, and obstructions, may change the characteristics of a signal resulting in different types of channels that are usually unpredictable and hard to characterize precisely. For example, wireless link 150a may, over time, change between two or more of Additive Gaussian White Noise (AWGN), Line of Sight (LOS) (Rician), Non-LOS (NLOS) (Rayleigh), fading, or multipath fading. The type of channel may impact the SNR that is required to reach a Block Error Rate (BLER) of 0.1 for a particular MCS level. This, in turn, may result in two adjacent MCS levels switching their relative order.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. This may allow network 110b, a PSTN network, to be able to transmit and receive communications from other non-PSTN networks, such as network 110d, an IP network. As a gateway, node 170e may work to translate communications between the various protocols used by different networks.

Endpoints 140 may provide data or network services to a user through any combination of hardware, software embedded in a computer readable medium, and/or encoded logic incorporated in hardware or otherwise stored (e.g., firmware). For example, endpoints 140a-140g may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
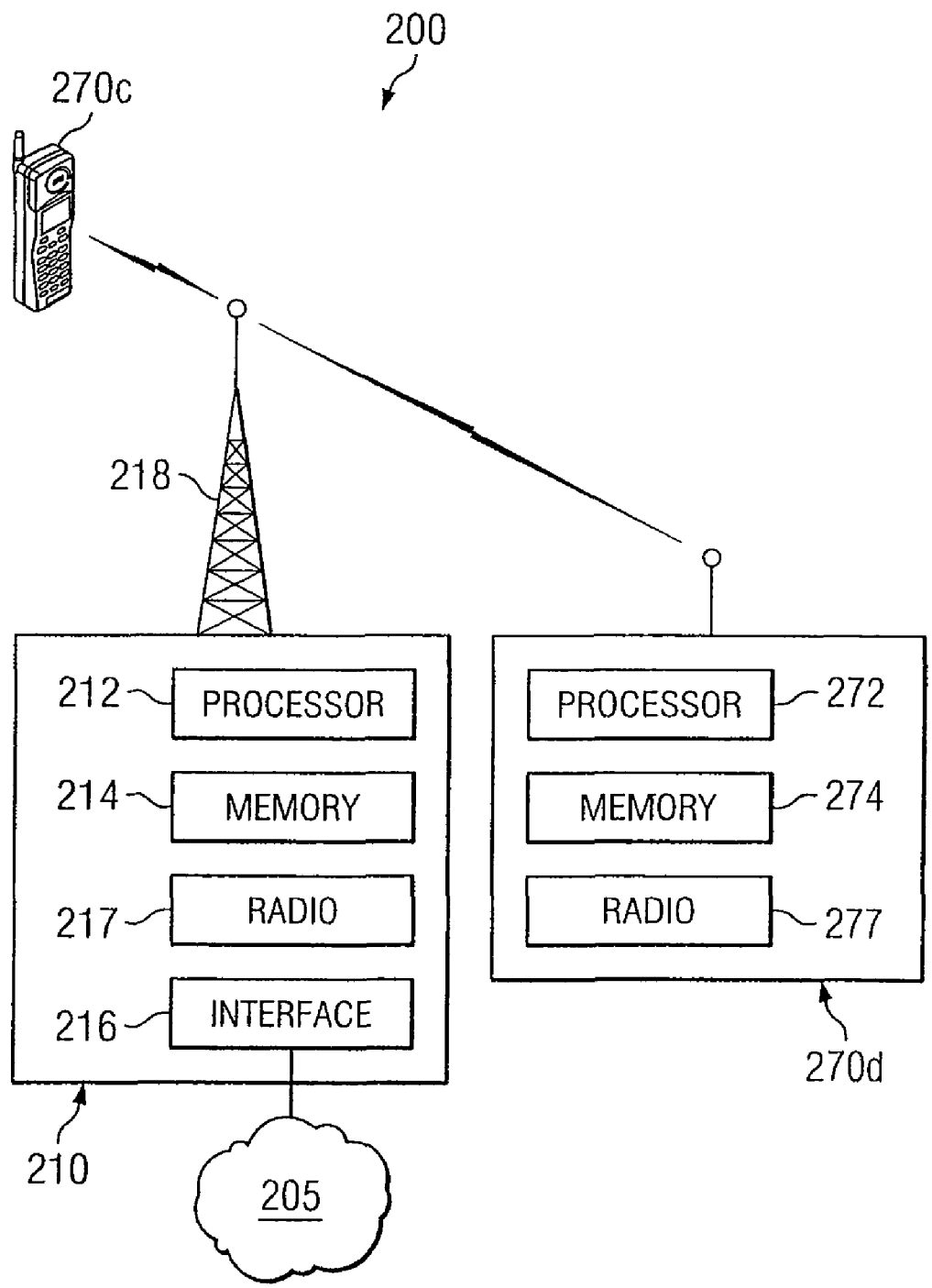
FIG. 2 illustrates a wireless network comprising a more detailed view of a base station and an endpoint, in accordance with a particular embodiment.

FIG. 2 illustrates a wireless network comprising a more detailed view of a base station and an endpoint, in accordance with a particular embodiment. In different embodiments network 200 may comprise any number of wired or wireless networks, base stations, endpoints, relay stations, and/or any other components that may facilitate or participate in the communication of data and/or signals whether via wired or wireless connections. For simplicity, wireless network 200, comprising base station 210 and endpoints 270 is coupled to wired network 205.

Network 205 may comprise one or more of the networks described above with respect to FIG. 1. For example, network 205 may comprise the Internet, a LAN, WAN, MAN, PSTN or some combination of the above.

Base station 210 comprises processor 212, memory 214, interface 216, radio 217 and antenna 218. These components may work together in order to provide base station functionality, such as getting the most efficient use out of the available wireless resources. More specifically, the components of base station 210 may allow base station 210 to select and use appropriate MCS levels for the endpoints connected thereto. In selecting an appropriate MCS level, base station 210 may attempt to balance the fact that higher MCS levels reduce the amount of wasted resources but increase the likelihood that the endpoint may receive errors. Accordingly, the ECQI information, including an MCS inversion bit, sent by an endpoint may be used by base station 210 to more confidently select an appropriate MCS level.

Processor 212 may be a microprocessor, controller, or any other suitable computing device, resource, or combination of hardware, software and/or encoded logic operable to provide, either alone or in conjunction with other base station 210 components, such as memory 214, base station 210 functionality. Such functionality may include providing various wireless features discussed herein to an endpoint or relay station. For example, processor 212 may determine the best appropriate MCS level to use for a particular endpoint by taking into account the ECQI provided by the particular endpoint, any ECQIs or traditional CQIs provided by other endpoints, resource availability, and/or the current network load. This may allow network 200 to support more endpoints and/or provide improved quality of service, as compared to a network in which endpoints 270 simply transmit a traditional CQI without an MCS level inversion bit.

Memory 214 may be any form of volatile or non-volatile memory including, without limitation, magnetic media, optical media, random access memory (RAM), read-only memory (ROM), flash memory, removable media, or any other suitable local or remote memory component or components. Memory 214 may store any suitable data or information utilized by base station 210, including software embedded in a computer readable medium, and/or encoded logic incorporated in hardware or otherwise stored (e.g., firmware).

In some embodiments, memory 214 may store information used by processor 212 in determining an appropriate MCS level for one of endpoints 270. For example, memory 214 may store a chart, table (e.g., Table 1), or other organization of data which correlates a particular SNR with a particular MCS level. A higher MCS level indicates a better quality connection or potential connection. In certain embodiments, the different MCS levels in a system may be ordered from low to high with respect to the modulation and coding rate. Accordingly, higher SNR levels may be needed for higher MCS levels.

Memory 214 may also store the results and/or intermediate results of the various calculations and determinations performed by processor 212 such as the capacity of network 200. In some embodiments, memory 214 may also store information regarding the MCS level being used for each endpoint 270 connected to base station 210.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. Interface 216 may also be used to establish any wired connections between base station 210 and other networks or network components.

Radio 217 may be coupled to or a part of antenna 218. Radio 217 may receive digital data that is to be sent out to other base stations, relay stations and/or endpoints via a wireless connection. The wireless connection may use the wireless resources assigned to base station 210. The wireless resources may include, for example, a combination of one or more of a center frequency, bandwidth, time slot, channel, and/or subchannel. In particular embodiments this information may be stored in memory 214. Radio 217 may convert the digital data into a radio signal having the appropriate center frequency and bandwidth parameters. These parameters may have been determined ahead of time by some combination of processor 212 and memory 214. The radio signal may then be transmitted via antenna 218 for receipt by any appropriate component or device (e.g., endpoint 270d). Similarly, radio 217 may convert radio signals received from antenna 218 into digital data to be processed by processor 212.

Antenna 218 may be any type of antenna capable of transmitting and receiving data and/or signals wirelessly. In some embodiments, antenna 218 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Radio 217 and antenna 218 may collectively form a wireless interface. This wireless interface may be used to establish connections with various wireless components, including endpoints and relay stations.

Endpoints 270 may be any type of wireless endpoints able to send and receive data and/or signals to and from base station 210. Some possible types of endpoints 270 may include desktop computers, PDAs, cell phones, laptops, and/or VoIP phones. While endpoints 270 may comprise similar components that perform similar features, for convenience, only the components of endpoint 270d are depicted. Endpoint 270d comprises processor 272, memory 274, and radio 277. These components may work together in order to provide endpoint functionality, such as communicating to base station 210 the MCS levels supported by endpoint 270d. More specifically, the components of endpoint 270d may allow endpoint 270d to identify the highest supported MCS level and to determine whether the immediately preceding MCS level is also supported. This information may then be communicated to base station 210 using, for example, an ECQI that includes an appropriately set MCS level inversion bit.

Processor 272 may be a microprocessor, controller, or any other suitable computing device, resource, or combination of hardware, software and/or encoded logic operable to provide, either alone or in conjunction with other endpoint 270d components, such as memory 274, endpoint 270d functionality. Such functionality may include providing various wireless features discussed herein to endpoint 270d. For example, in particular embodiments, processor 272 may be able to determine which MCS levels are supported based on the detected channel type and SNR. This information may be provided by radio 277.

For example, assume that radio 277 has received a signal which processor 272 determines comprises a multipath channel. Processor 272 may determine that in order to achieve an acceptable channel BLER (e.g., a BLER of 0.1) in the PB3 type channel, the required SNR for each MCS level listed in Table 1 above is as follows starting from the top: 6.3 dB, 11.4 dB, 17.3 dB, 16.8 dB, 20.7 dB, 22.3 dB, 25 dB. Thus, the order of 16QAM ¾ and 64QAM ½ has, in essence, been reversed from that in Table 1 (e.g., 16QAM ¾ requires a higher SNR (17.3) then 64QAM ½ (16.8)). This may cause a problem in the standard CQI reporting mechanism because if endpoint 270 was to signal to base station 210 that it can support 64QAM ½, base station 210 would assume that 16QAM ¾ is also supported. However, in this particular instance, endpoint 270 cannot support 16QAM ¾, and errors would likely occur if base station 210 were to send a packet to endpoint 270d using 16QAM ¾. However, simply sending packets using 16QAM ½, while potentially avoiding errors, would be inefficient because endpoint 270d can support 64QAM ½. Accordingly, processor 272 may send an ECQI message indicating that it can support higher MCS levels, such as 64QAM ½, but that the immediately preceding level, 16QAM ¾, is not supported. This may be done by processor 272 setting an MCS level inversion bit to 1 to indicate that the MCS level one level below the highest supported MCS level in a traditional MCS level table, such as Table 1 above is not supported. Thus, the MCS level inversion bit allows ECQI to be used in a variety of channel conditions even if the CQI index is not computed for each of the variety of channels. This may relieve the base station of the need to estimate the channel and/or the endpoint of the need to signal the channel type while only increasing the amount of overhead by a single bit.

Memory 274 may be any form of volatile or non-volatile memory including, without limitation, magnetic media, optical media, random access memory (RAM), read-only memory (ROM), flash memory, removable media, or any other suitable local or remote memory component or components. Memory 274 may store any suitable data or information utilized by endpoint 270d, including software embedded in a computer readable medium, and/or encoded logic incorporated in hardware or otherwise stored (e.g., firmware).

In some embodiments, memory 274 may store information used by processor 272 in determining which MCS levels are supported based on the detected SNR and/or the channel type. For example, memory 274 may store a chart, table (e.g., Table 1), or other organization of data which correlates a particular SNR with a particular MCS level. In certain embodiments, the different MCS levels may be ordered from low to high with respect to the modulation and coding rate and their respective required SNR levels. Memory 274 may also store the results and/or intermediate results of the various calculations and determinations performed by processor 272.

Radio 277 may be coupled to or a part of an antenna to send/receive digital data to/from, for example, base station 210 via a wireless connection. In particular embodiments, information related to the wireless connection (e.g., the wireless resources assigned to endpoint 270d) may be stored in memory 274. Radio 277 may convert digital data into a radio signal having the appropriate center frequency and bandwidth parameters. These parameters may have been determined ahead of time and stored in memory 274. The radio signal may then be transmitted for receipt by any appropriate component or device (e.g., base station 210). Similarly, radio 277 may convert radio signals received from a device (e.g., base station 210) into digital data to be processed by processor 272.

In some embodiments, processor 272 may be able to determine the SNR of an incoming downlink transmission from, for example, base station 210. In some embodiments, processor 272 may be used to determine the type of channel that is being used to receive information from base station 210. For example, the wireless channel 280 may include AWGN, LOS (Rician), NLOS (Rayleigh), fading, or multipath fading. This information may be sent to processor 272 along with information stored in memory 274 to determine the highest supported MCS level and whether the immediately preceding MCS level is also supported. The actual channel between the endpoint and the base station may vary from moment to moment and is usually unpredictable and hard to characterize.

While FIG. 2 only depicts endpoints 270 communicating with base station 210, particular embodiments or scenarios may involve any two components having a wireless link therebetween in which one component functions as a master and the other functions as a slave (the master making decisions on which MCS level to use). For example, a relay station may function as a slave station to base station 210 on a relay link and send base station 210 a message with an ECQI for a wireless link between the relay station and base station 210.

Figure 3:
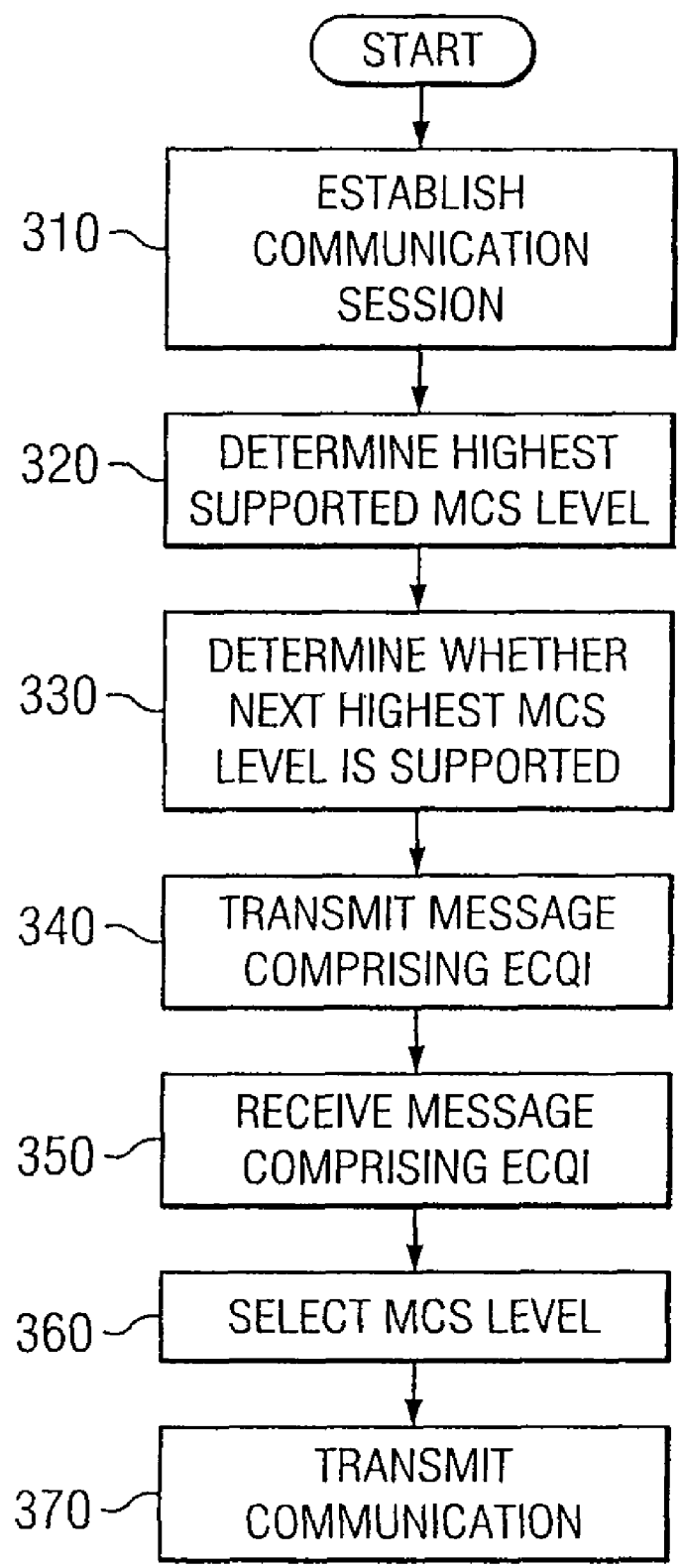
FIG. 3 illustrates a method for implementing effective channel quality indication, in accordance with a particular embodiment.

FIG. 3 illustrates a method for implementing effective channel quality indication, in accordance with particular embodiments. The method begins at step 310 by establishing a communication session between an endpoint and an access station. The access station may be a base station, relay station, or any other device or component configured to communicate wirelessly with the endpoint. The communication session may be established via a wireless connection that may comprise a varying channel. For example, depending on the situation, the channel used for the communication session may vary between AWGN, LOS, NLOS, fading, and multipath fading. While the access station may be unaware of the type of channel being received by the endpoint, the endpoint may be able to detect and determine the type of channel. From the perspective of the endpoint, the wireless connection may be used to receive information from the access station (e.g., a downlink) and to send information to the access station (e.g., an uplink)

At step 320 the highest MCS level supported by the endpoint is determined. The highest supported MCS level may be determined by the endpoint based on the channel quality measured from the downlink signal sent from the access station. For example, from the downlink signal the endpoint may be able to take various quality measurements which may be used to determine the SNR. The endpoint may also be able to determine what type of channel is being received from the access station. Based on the determined SNR and the channel type, the endpoint may be able to determine which MCS levels are supported. In some embodiments, this may include looking up an MCS level corresponding to the detected SNR in a table such as Table 1 above. In some embodiments, the channel type and SNR may be determined from a standard pilot signal transmitted by the access station.

At step 330 the endpoint determines whether the immediately preceding MCS level is also supported. In some embodiments, certain MCS levels may be switched based on the actual channel type of the wireless connection. More specifically, the sequence of required SNRs for particular MCS levels may change depending on the channel type. For example, in some situations the required SNR for 64QAM ½ may be lower than the SNR required for 16QAM ¾.

Once the endpoint has determined the highest supported MCS value as well as whether or not the immediately preceding MCS value is also supported, the endpoint may transmit a message comprising an ECQI at step 340. This message may then be received by the access station at step 350. The ECQI may alert the access station of the highest supported MCS level and whether the immediately preceding MCS value is also supported. In some embodiments, an MCS inversion bit may be used to alert the access station as to whether the immediately preceding MCS level is supported. For example, if the immediately preceding MCS level is supported, then the inversion bit may be set to 0. If the immediately preceding MCS level is not supported, the inversion bit may be set to 1.

Based on the ECQI received from the endpoint, along with any other relevant factors (e.g., network load, available resources, etc.), the access station selects an appropriate MCS level to use for communications sent to the endpoint at step 360. In selecting an appropriate MCS level, the access station may consider the highest supported MCS level and any lower MCS levels. The access station may remove from consideration the MCS level immediately preceding the highest supported MCS level if it is determined that the MCS level inversion bit is set to indicate that immediately preceding MCS level is not supported. For example, if the ECQI indicates that the endpoint can support 64QAM ½, it implies that the endpoint can receive every MCS level that requires a lower SNR (e.g., QPSK ½, ¾ and 16QAM ½ and ¾) unless the MCS level inversion bit is set to indicate that the immediate preceding MCS level is not supported—in which case 16QAM ¾ would be excluded. This may be based on the assumption that even if the required SNR of the highest and immediately preceding MCS levels are switched, the current channel condition is likely good enough to support all the MCS levels below the MCS level immediately preceding the highest supported MCS level. Then, at step 370 a communication is sent to the endpoint using the selected MCS level. The communication may include any data or signaling intended for the endpoint.

In some embodiments, the steps depicted in FIG. 3 may be repeated on a frame-by-frame basis, on a periodic basis, or in response to a particular trigger (e.g., the endpoint detects a change in the channel type).

Some of the steps illustrated in FIG. 3 may be combined, modified or deleted where appropriate, and additional steps may also be added to the flowchart. For example, in some embodiments the method may include a step of transmitting a pilot signal from the access station to the endpoint. Additionally, steps may be performed in any suitable order without departing from the scope of particular embodiments.

Although particular embodiments have been described in detail, it should be understood that various other changes, substitutions, combinations and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. For example, in some embodiments, a relay station may function as an endpoint in communicating an ECQI to a base station. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for implementing effective channel quality indication, comprising:
    establishing, at an endpoint of a wireless network, a communication session with an access station via a wireless connection;
    determining a highest modulation and coding scheme ("MCS") level supported by the endpoint using the wireless connection;
    determining whether an immediately preceding MCS level is supported by the endpoint using the wireless connection, wherein the immediately preceding MCS level is one level below the highest supported MCS level for the wireless connection; and
    transmitting a message from the endpoint, the message comprising an effective channel quality indication ("ECQI"), the ECQI comprising an indication of the highest supported MCS level for the wireless connection and an indication of whether the endpoint supports the immediately preceding MCS level for the wireless connection.

2. The method of claim 1, wherein the indication of whether the endpoint supports the immediately preceding MCS level for the wireless connection comprises an MCS level inversion bit in the ECQI that is set based on the determination of whether the immediately preceding MCS level is supported by the endpoint using the wireless connection.

3. The method of claim 1, wherein determining the highest MCS level supported by the endpoint using the wireless connection comprises determining a signal-to-noise ratio for the wireless connection.

4. The method of claim 3, wherein determining the signal-to-noise ratio for the wireless connection comprises determining the signal-to-noise ratio for the wireless connection from a downlink signal generated by the access station.

5. The method of claim 1, wherein determining whether the immediately preceding MCS level is supported by the endpoint using a channel comprises determining a channel type associated with the channel.

6. A device for implementing effective channel quality indication, comprising:
    an interface operable to establish a communication session with an access station via a wireless connection; and
    a processor coupled to the interface and operable to:
        determine a highest modulation and coding scheme ("MCS") level supported by the endpoint using the wireless connection; and
        determine whether an immediately preceding MCS level is supported by the endpoint using the wireless connection, wherein the immediately preceding MCS level is one level below the highest supported MCS level for the wireless connection;
    wherein the interface is further operable to transmit a message from the endpoint, the message comprising an effective channel quality indication ("ECQI"), the ECQI comprising an indication of the highest supported MCS level for the wireless connection and an indication of whether the endpoint supports the immediately preceding MCS level for the wireless connection.

7. The device of claim 6, wherein the indication of whether the endpoint supports the immediately preceding MCS level for the wireless connection comprises an MCS level inversion bit in the ECQI that is set based on the determination of whether the immediately preceding MCS level is supported by the endpoint using the wireless connection.

8. The device of claim 6, wherein the processor operable to determine the highest MCS level supported by the endpoint using the wireless connection is further operable to determine a signal-to-noise ratio for the wireless connection.

9. The device of claim 8, wherein the processor operable to determine the signal-to-noise ratio for the wireless connection is further operable to determine the signal-to-noise ratio for the wireless connection from a downlink signal generated by the access station.

10. The device of claim 6, wherein determining whether the immediately preceding MCS level is supported by the endpoint using a channel comprises determining a channel type associated with the channel.

* * * * *